under 35 U.S.C. 154(b) by 264 days.

United States Patent
Williams et al.

(10) Patent No.: US 10,733,559 B2
(45) Date of Patent: Aug. 4, 2020

(54) SYSTEMS AND METHODS FOR GENERATING CHARGEBACK ANALYTICS ASSOCIATED WITH SERVICE CHARGEBACKS

(71) Applicant: MasterCard International Incorporated, Purchase, NY (US)

(72) Inventors: Kyle Williams, O'Fallon, MO (US); David J. Senci, Troy, IL (US); John Larko, Wildwood, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 264 days.

(21) Appl. No.: 15/802,328

(22) Filed: Nov. 2, 2017

(65) Prior Publication Data

US 2019/0130334 A1 May 2, 2019

(51) Int. Cl.
*G06Q 40/00* (2012.01)
*G06Q 10/06* (2012.01)
(Continued)

(52) U.S. Cl.
CPC . *G06Q 10/06393* (2013.01); *G06F 16/24578* (2019.01); *G06Q 30/0282* (2013.01); *G06Q 40/025* (2013.01); *G06Q 40/12* (2013.12)

(58) Field of Classification Search
CPC ......... G06Q 10/0639; G06Q 10/06393; G06Q 30/0282
See application file for complete search history.

(56) References Cited

U.S. PATENT DOCUMENTS 6,154,729 A * 11/2000 Cannon ................. G06Q 40/00
                                                            705/1.1
7,428,509 B2 * 9/2008 Klebanoff ............. G06Q 20/10
                                                            705/35
(Continued)

OTHER PUBLICATIONS

Matthews, Cassi, Average Chargeback Rates: How Does Your Business Compare Chargeback.com, May 6, 2015 (Year: 2015).*

(Continued)

*Primary Examiner* — Scott L Jarrett
(74) *Attorney, Agent, or Firm* — Armstrong Teasdale LLP

(57) ABSTRACT

A chargeback analytics computing device for generating chargeback analytics associated with service chargebacks is provided. The chargeback analytics computing device is configured to retrieve transaction data for a merchant, the transaction data associated with transactions initiated at the merchant, and extract chargeback data from the transaction data, the chargeback data associated with chargeback transactions. The chargeback analytics computing device also parses the chargeback data to identify a chargeback reason code associated with each chargeback transaction. Based upon the chargeback reason codes, the chargeback analytics computing device isolates a fraud-related portion and a non-fraud-related portion of the chargeback data, and extracts a service subset of the non-fraud-related portion associated with service chargeback transactions, wherein a service chargeback transaction is initiated by a cardholder having an unsatisfactory experience with the merchant. The chargeback analytics computing device is configured to calculate and transmit a merchant experience score based upon the service subset.

17 Claims, 6 Drawing Sheets

(51) Int. Cl.
   *G06Q 30/02*     (2012.01)
   *G06F 16/2457*   (2019.01)
   *G06Q 40/02*     (2012.01)

(56) References Cited

U.S. PATENT DOCUMENTS

| | | | | |
|---|---|---|---|---|
| 7,620,592 B2* | 11/2009 | O'Mara | G06Q 40/00 | 705/35 |
| 7,996,252 B2* | 8/2011 | Shahrabi | G06Q 10/063 | 705/7.32 |
| 8,126,779 B2* | 2/2012 | Wanker | G06Q 30/02 | 705/26.1 |
| 8,346,638 B2* | 1/2013 | Phillips | G06Q 20/102 | 705/35 |
| 8,655,773 B1* | 2/2014 | Fasoli | G06Q 40/00 | 705/38 |
| 8,725,597 B2* | 5/2014 | Mauseth | G06Q 10/10 | 705/28 |
| 8,781,881 B2* | 7/2014 | Olives | G06Q 10/0639 | 705/7.38 |
| 8,818,882 B2* | 8/2014 | Carlson | G06Q 20/10 | 705/26.1 |
| 9,652,772 B1* | 5/2017 | Eyges | G06Q 20/4016 | |
| 9,947,055 B1* | 4/2018 | Roumeliotis | G06Q 40/12 | |
| 10,504,122 B2* | 12/2019 | Senci | G06Q 40/02 | |
| 2002/0007302 A1* | 1/2002 | Work | G06Q 10/06 | 705/7.29 |
| 2002/0174031 A1* | 11/2002 | Weiss | G06Q 20/04 | 705/26.1 |
| 2003/0061132 A1* | 3/2003 | Yu, Sr. | G06Q 30/02 | 705/30 |
| 2003/0233292 A1* | 12/2003 | Richey | G06Q 10/087 | 705/28 |
| 2003/0236755 A1* | 12/2003 | Dagelet, Jr. | G06Q 20/28 | 705/68 |
| 2004/0068431 A1* | 4/2004 | Smith | G06Q 10/063112 | 705/7.14 |
| 2007/0073615 A1* | 3/2007 | Marchesi | G06Q 20/10 | 705/39 |
| 2008/0183552 A1* | 7/2008 | O'Hagan | G06Q 10/06375 | 705/7.31 |
| 2008/0270209 A1* | 10/2008 | Mauseth | G06Q 10/10 | 705/7.29 |
| 2008/0308624 A1* | 12/2008 | Gardner | G06Q 20/227 | 235/380 |
| 2010/0076812 A1 | 3/2010 | Ghosh et al. | | |
| 2010/0106611 A1* | 4/2010 | Paulsen | G06Q 20/10 | 705/26.1 |
| 2010/0312675 A1* | 12/2010 | Awad | G06Q 20/10 | 705/30 |
| 2011/0066472 A1* | 3/2011 | Scheider | G06Q 10/06 | 705/7.29 |
| 2011/0246357 A1* | 10/2011 | Young | G06Q 20/10 | 705/39 |
| 2012/0296724 A1 | 11/2012 | Faro et al. | | |
| 2013/0024339 A1* | 1/2013 | Choudhuri | G06Q 30/0185 | 705/35 |
| 2013/0024358 A1* | 1/2013 | Choudhuri | G06Q 20/4016 | 705/38 |
| 2013/0024375 A1* | 1/2013 | Choudhuri | G06Q 40/00 | 705/44 |
| 2013/0173320 A1* | 7/2013 | Bank | G06Q 10/0639 | 705/7.11 |
| 2013/0297492 A1* | 11/2013 | Ertresvaag | G06Q 20/389 | 705/39 |
| 2014/0039942 A1* | 2/2014 | Groarke | G06Q 10/10 | 705/5 |
| 2014/0039974 A1* | 2/2014 | Groarke | G06Q 20/12 | 705/7.29 |
| 2014/0207637 A1* | 7/2014 | Groarke | G06Q 40/00 | 705/35 |
| 2014/0279500 A1* | 9/2014 | Larko | G06Q 30/016 | 705/44 |
| 2015/0348036 A1* | 12/2015 | Nordyke | G06Q 20/407 | 705/35 |
| 2015/0348207 A1* | 12/2015 | Nordyke | G06Q 40/12 | 707/769 |
| 2015/0348208 A1* | 12/2015 | Nordyke | G06Q 40/12 | 705/30 |
| 2016/0110671 A1 | 4/2016 | Ghosh et al. | | |
| 2016/0267406 A1* | 9/2016 | Bodo | G06Q 10/0635 | |
| 2016/0379216 A1* | 12/2016 | Wang | G06Q 20/407 | 705/44 |
| 2017/0024783 A1 | 1/2017 | Gupta et al. | | |
| 2018/0158062 A1* | 6/2018 | Kohli | G06Q 20/4016 | |
| 2019/0087805 A1* | 3/2019 | Hayes | G06Q 20/24 | |

OTHER PUBLICATIONS

Chargeback Reason Code List—U.S. Apr. 2013 (Year: 2013).*
Chargeback Management Guidelines for Visa Merchants Visa, 2015 (Year: 2015).*
Hayaski, Fumiko et al., Chargebacks: Another Payment Card Acceptance Cost for Merchants The Federal Reserve Bank of Kanasa City, Jan. 2016 (Year: 2016).*
PayPal Advanced Chargeback Management User's Guide PayPal, Aug. 2013 (Year: 2013).*
Green, Kent, There's No Disputing it: Chargeback Data Reports Were a Long Time Coming BrainTreePayments.com, Apr. 15, 2014 (Year: 2014).*

* cited by examiner

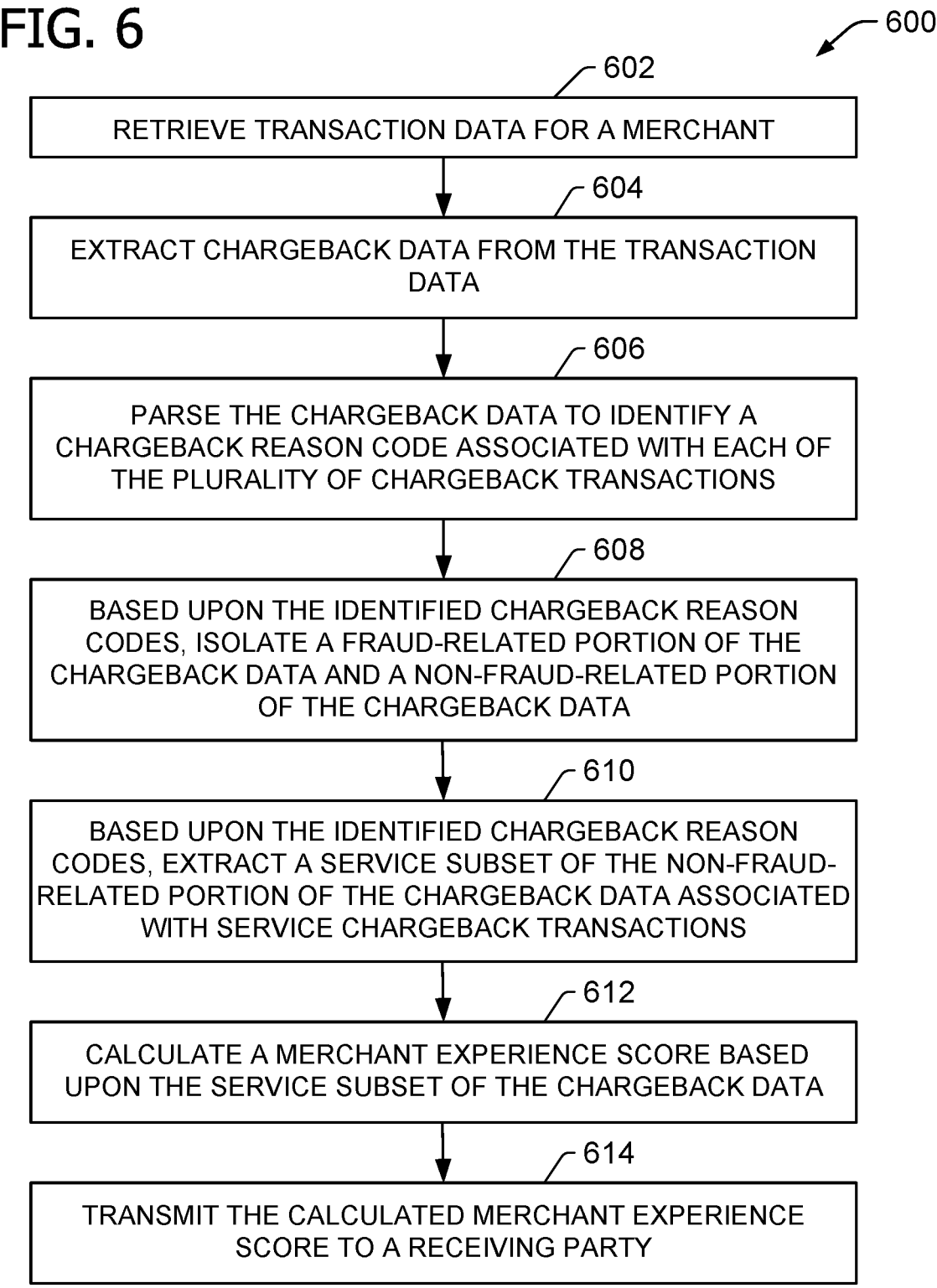

SYSTEMS AND METHODS FOR GENERATING CHARGEBACK ANALYTICS ASSOCIATED WITH SERVICE CHARGEBACKS

BACKGROUND

This disclosure relates to transaction processing networks and, more specifically, to network-based systems and methods for generating chargeback analytics associated with service chargebacks.

When a user of an account, such as an account associated with a payment card (e.g., a credit card or a debit card), authorizes a transaction to purchase goods or services from a merchant using the account, an acquiring bank (i.e., a merchant bank) reimburses the merchant for the transaction. The acquiring bank then settles those funds with an issuing bank (issuer) of the account corresponding to the payment card or with a third party processor authorized to act on behalf of the issuing bank by presenting the transaction into a payment network. In a process known as clearing, transaction data is moved from the acquiring bank to a payment processor, and from the payment processor to the issuing bank. After clearing, settlement of the final payment occurs. Settlement is a process used to exchange funds between the acquiring bank and the issuing bank (or third party processor) for the net value of a batch of all monetary transactions that have cleared for that processing day.

In some cases, the consumer may request a full or partial refund of the cost of the services or goods. For example, in some cases, the consumer may allege that they did not initiate the purchase (e.g., the purchase was fraudulent). In other cases, the consumer may be dissatisfied with their experience with the merchant, as the goods or services provided by the merchant were unsatisfactory (e.g., were not provided at all, were not provided in part, were not provided as advertised, etc.). These refund requests are known as "chargebacks." In these examples, the consumer may request a chargeback (also referred to as a first presentment, or simply a presentment) from the issuing bank. The chargeback is used to return the funds to the account corresponding to the payment card. Generally, the issuing bank immediately issues a credit to the account for the amount of the transaction. The issuing bank then sends a chargeback request to an issuer processor, and the request is collected with other requests and submitted in a batch to the payment network for presentment to the acquiring bank. Each time a chargeback is initiated, the issuing bank must pay a fee to get the process started to determine which party will be left with the cost of the purchase of the item or services. Depending on the outcome, the cost of the transaction may be left with the account in question, the issuing bank, the acquiring bank, or the merchant.

Therefore, in an effort to conserve time and resources, it may be beneficial for an issuer and/or an acquirer to identify those merchants that are frequently identified for chargebacks. At least some known chargeback systems may provide some sort of rating of merchants associated with chargebacks, such as the overall number of chargebacks initiated for a merchant. However, these known systems do not filter the chargeback data but rather use all chargeback data associated with a merchant, including fraud-related chargebacks (e.g., which account for over 50% of chargebacks) and non-fraud-related chargebacks. By using all chargeback data, these known systems and their merchant ratings obscure the source of chargebacks associated with the merchant. For instance, a merchant may provide a high level of service but may have had a plurality of fraudulent purchases made therewith. Accordingly, these known systems may rate this merchant with a low score or ranking compared to other merchants, even though the merchant is not at fault and "true" cardholders tend to have good experiences at that merchant. Such systems not only process all chargeback data, which can consume considerable processing time and resources, but provide a general metric that may not service the specific purpose of identifying poorly performing merchants.

BRIEF DESCRIPTION

In one aspect, a chargeback analytics computing device including a processor in communication with a memory is provided. The processor is programmed to retrieve transaction data for a merchant, the transaction data associated with a plurality of transactions initiated at the merchant by a corresponding plurality of cardholders, and extract chargeback data from the transaction data, the chargeback data associated with a plurality of chargeback transactions. The processor is also programmed to parse the chargeback data to identify a chargeback reason code associated with each of the plurality of chargeback transactions. The processor is further programmed to, based upon the identified chargeback reason codes, isolate a fraud-related portion of the chargeback data and a non-fraud-related portion of the chargeback data, and extract a service subset of the non-fraud-related portion of the chargeback data associated with service chargeback transactions, wherein a service chargeback transaction is initiated by a cardholder having an unsatisfactory experience with the merchant. The processor is still further programmed to calculate a merchant experience score based upon the service subset of the chargeback data, and transmit the calculated merchant experience score to a receiving party.

In another aspect, a computer-implemented method for generating chargeback analytics associated with service chargebacks is provided. The method is implemented using a chargeback analytics computing device including a processor in communication with a memory. The method includes retrieving transaction data for a merchant, the transaction data associated with a plurality of transactions initiated at the merchant by a corresponding plurality of cardholders, and extracting chargeback data from the transaction data, the chargeback data associated with a plurality of chargeback transactions. The method also includes parsing the chargeback data to identify a chargeback reason code associated with each of the plurality of chargeback transactions. The method further includes, based upon the identified chargeback reason codes, isolating a fraud-related portion of the chargeback data and a non-fraud-related portion of the chargeback data, and extracting a service subset of the non-fraud-related portion of the chargeback data associated with service chargeback transactions, wherein a service chargeback transaction is initiated by a cardholder having an unsatisfactory experience with the merchant. The method also includes calculating a merchant experience score based upon the service subset of the chargeback data, and transmitting the calculated merchant experience score to a receiving party.

In yet another aspect, a non-transitory computer-readable storage medium having computer-executable instructions embodied thereon is provided. When executed by a chargeback analytics computing device including at least one processor coupled to a memory, the computer-executable instructions cause the chargeback analytics computing device to retrieve transaction data for a merchant, the transaction data associated with a plurality of transactions initiated at the merchant by a corresponding plurality of cardholders, and extract chargeback data from the transaction data, the chargeback data associated with a plurality of chargeback transactions. The computer-executable instructions also cause the chargeback analytics computing device to parse the chargeback data to identify a chargeback reason code associated with each of the plurality of chargeback transactions. The computer-executable instructions further cause the chargeback analytics computing device to, based upon the identified chargeback reason codes, isolate a fraud-related portion of the chargeback data and a non-fraud-related portion of the chargeback data, and extract a service subset of the non-fraud-related portion of the chargeback data associated with service chargeback transactions, wherein a service chargeback transaction is initiated by a cardholder having an unsatisfactory experience with the merchant. The computer-executable instructions cause the chargeback analytics computing device to calculate a merchant experience score based upon the service subset of the chargeback data, and transmit the calculated merchant experience score to a receiving party.

BRIEF DESCRIPTION OF THE DRAWINGS

FIGS. 1-6 show example embodiments of the methods and systems described herein.

FIG. 1 is an example multi-party transaction processing network for processing data associated with financial transactions.

FIG. 2 is a block diagram of a system associated with the transaction processing network shown in FIG. 1, including a chargeback analytics computing device.

FIG. 3 illustrates an example configuration of a client computing device that may be used in the transaction processing network shown in FIG. 1 or the system shown in FIG. 2.

FIG. 4 illustrates an example configuration of a server system that may be used in the transaction processing network shown in FIG. 1 or the system shown in FIG. 2.

FIG. 5 is an example data flow diagram illustrating the flow of data between components of the system shown in FIG. 2.

FIG. 6 is a flowchart of an example process for generating chargeback analytics using the system shown in FIG. 2.

Figure 1:
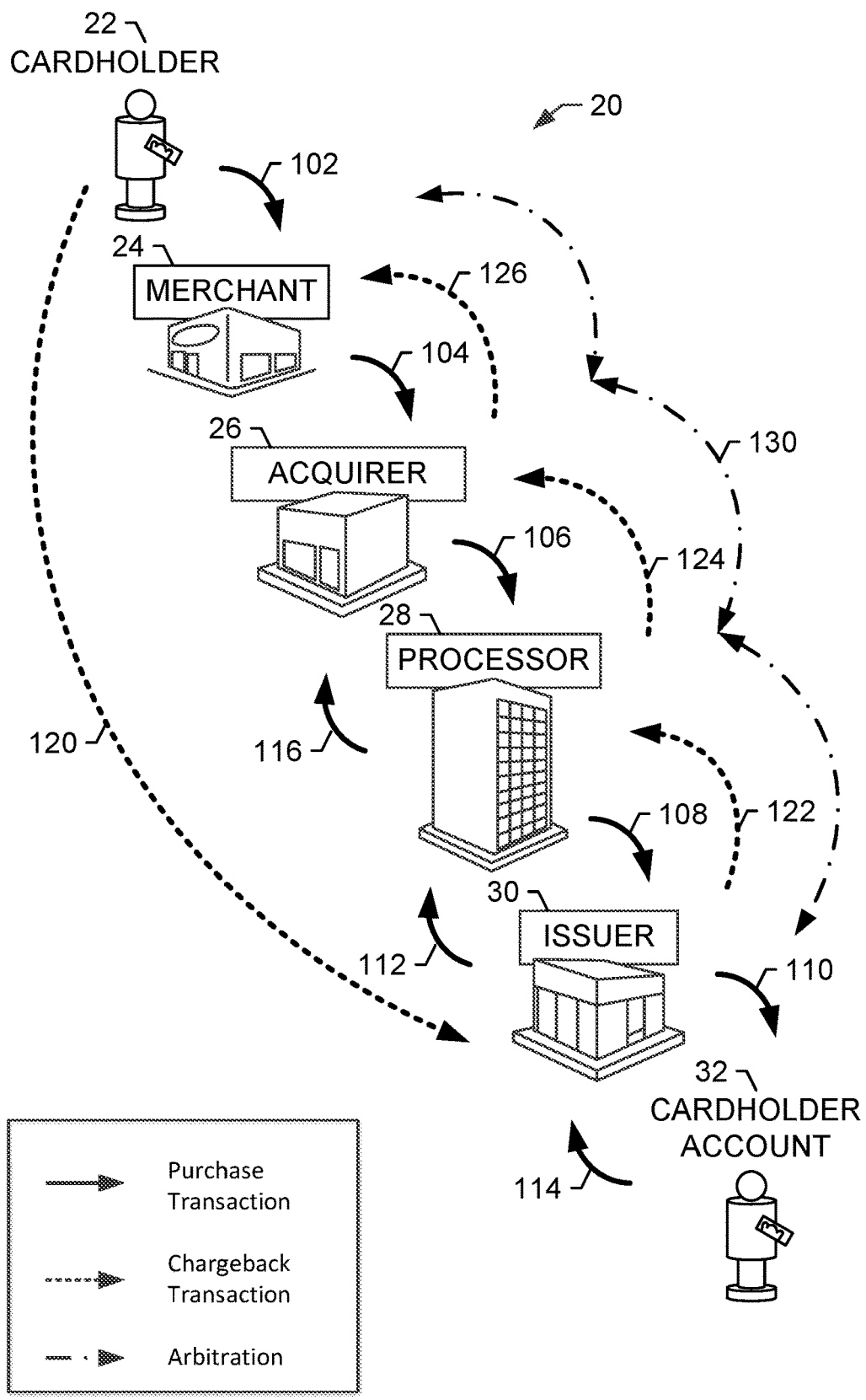

Like numbers in the Figures indicates the same or functionally similar components. Although specific features of various embodiments may be shown in some figures and not in others, this is for convenience only. Any feature of any figure may be referenced and/or claimed in combination with any feature of any other figure.

DETAILED DESCRIPTION

A chargeback occurs when either an issuer or a user of an account (i.e., a cardholder) indicates that a transaction charge be removed from the account and the funds from the transaction returned to the account. Chargebacks may be fraud related (e.g., the cardholder alleges they were not involved in a purchase or payment transaction) or non-fraud related (e.g., the cardholder acknowledges they were involved in the transaction but are unsatisfied with an outcome of the transaction). Each time a transaction is charged back, a payment processor of the transaction receives a record of the chargeback ("chargeback transaction data"). In the example embodiment, the chargeback transaction data includes a specific data element known as a "reason code" that explains why the chargeback was initiated, as well as other details/features about the transaction. This record is further transmitted by the payment processor to the merchant/acquirer associated with the transaction, generally in the form of a chargeback message.

Transaction processing networks or chargeback networks (e.g., Mastercard™, VISA™, etc.) are in a unique position within the payment ecosystem to provide insight into the chargeback process and which merchants are frequently identified in chargeback transactions. Specifically, the transaction processing network may provide chargeback transaction data associated with merchants having a threshold number of chargeback transactions associated with one or more reason codes that identify cardholder dissatisfaction with their experience with the merchants, referred to herein as "service chargebacks." Put another way, service chargebacks are initiated by consumers (e.g., cardholders) that have an unsatisfactory experience with the merchant. For instance, the cardholder may allege in the chargeback transaction that the merchant did not provide the goods or services advertised. In one example, a hotel advertises having a plurality of amenities, but does not actually offer or have all of those amenities, so a cardholder requests a partial refund for their stay at that hotel. As another example, an online merchant may fail to ship or deliver a good ordered by the cardholder, and the cardholder requests a full refund for the good not rendered thereto. These service chargebacks are specifically indicated by a reason code that is embedded in service chargeback transaction data by the issuer as the issuer generates the service chargeback transaction for processing. The reason codes may be predefined and provided to the issuer (and one or more other parties to the service chargeback transaction, such as the acquirer, merchant, and/or payment processor of the transaction processing network), such that the nature of any chargeback transaction may be easily identified between parties.

Identifying and scoring or ranking merchants based upon the frequency or volume of service chargebacks may provide cardholders, issuers, and/or acquirers insight into merchants with which they may not want to do business, as cardholders are frequently dissatisfied with that merchant. As described above, chargebacks represent a significant cost as well as significant processing time and resources to process and resolve. Identifying poorly performing merchants may facilitate reducing the number of service chargebacks that are processed by the network, thereby reducing network traffic and strain and freeing up both processing and monetary resources for other matters.

The embodiments described herein include a chargeback analytics computing device configured to process and parse transaction data, specifically chargeback data, associated with a merchant in order to generate a merchant experience score. The merchant experience score is a quantitative metric of cardholders' experience with and satisfaction with (or lack thereof) with the merchant. In particular, the chargeback analytics computing device analyzes chargeback data to identify, using reason codes indicating the nature of a chargeback transaction, "service chargebacks," or chargeback related to a poor cardholder experience with the merchant (e.g., goods or services not provided).

In one example embodiment, the chargeback analytics computing device retrieves transaction data for a merchant, the transaction data associated with a plurality of transactions initiated at the merchant by a corresponding plurality of cardholders. According to one or more example embodiments, the chargeback analytics computing device may be in communication with and/or integral to a payment processor. The chargeback analytics computing device may access (e.g., retrieve and/or receive) transaction data from the payment processor and/or from a database at which the payment processor stores transaction data.

In some embodiments, the chargeback analytics computing device may receive one or more requests (e.g., via the transaction processing network or otherwise) to generate metrics for a merchant (e.g., a merchant experience score). The request may identify one or more merchants for which to generate the metrics. The request may originate from, for example, the merchant(s) themselves, an acquirer, an issuer, a cardholder, and/or another entity. For instance, when the requests originate from the merchant(s), the merchant(s) may use the metrics in advertisements to consumers (e.g., cardholders, etc.) in order to solicit business. When the requests originate from other parties, those parties may then use the metrics in advertisements to the consumers on behalf of the merchant(s) (e.g., to highlight certain merchants with higher scores as trusted merchants, etc.), or they may use the metrics to help determine with which merchants to associate (e.g., as trusted merchants, etc.), to help inhibit dealings with potentially unreliable merchants, or to compare the merchants to each other or to other merchants in similar industries, etc. These "requesting parties" (which may also be referred to as "receiving parties" when described as receiving metrics) may include, without limitation, online shopping providers of aggregated merchant sales listings (e.g., Amazon™, Google™, Etsy™, eBay™, Yelp™, TripAdvisor™, etc.), manufacturers, shipping entities, rating entities, ranking entities, review entities, etc. Receiving a request may cause the chargeback analytics computing device to initiate the retrieval of the transaction data.

Additionally or alternatively, the chargeback analytics computing device may detect that a threshold number of service chargeback transactions (e.g., more than X number of service chargebacks) associated with the merchant have been initiated, and subsequently initiate the retrieval of the transaction data. In some cases, the payment processor (or another entity) may detect that the threshold number of service chargeback transactions have been initiated and may send an alert or instruction message to the chargeback analytics computing device. The alert/instruction message may activate the chargeback analytics computing device to initiate the retrieval of the transaction data.

The chargeback analytics computing device extracts chargeback data from the retrieved transaction data, the chargeback data associated with a plurality of chargeback transactions. In other words, the chargeback analytics computing device separates transaction data associated with chargeback transactions from transaction data associated with purchase or payment transactions. In some embodiments, the chargeback analytics computing device may extract the chargeback data by identifying the presence of a reason code data element that is only used/present for chargeback transaction processing (e.g., this data element is blank or absent for transaction records associated with payment/purchase transactions). In other embodiments, the chargeback analytics computing device may extract the chargeback data using one or more other processing methods.

The chargeback analytics computing device parses the chargeback data to identify a chargeback reason code associated with each of the plurality of chargeback transactions. In some embodiments, the chargeback analytics computing device accesses a table or list of chargeback reason codes and their respective "reasons" or meanings. For example, a reason code of the string "1234" may be associated with a "goods or services not received" reason for initiating the chargeback. As used herein, "parsing" may refer to electronically processing data to detect one or more data elements within the data. For instance, parsing may refer to character recognition and/or scanning transaction data to detect the presence of characters within the reason code data element (and, in some embodiments, identifying those characters within the reason code data element as a particular predefined reason code associated with a service chargeback, as described further herein).

Based upon the identified chargeback reason codes, the chargeback analytics computing device isolates a fraud-related portion of the chargeback data and a non-fraud-related portion of the chargeback data. In other words, the chargeback analytics computing device reduces the amount of data for further processing by disregarding or discarding the chargeback data not relevant to the generation of the merchant experience score (and/or any other metrics described herein), such as the fraud-related portion of the chargeback data. In addition, based upon the identified chargeback reason codes, the chargeback analytics computing device extracts a "service subset" of the non-fraud-related portion of the chargeback data. The service subset of the chargeback data includes the data associated with service chargeback transactions, wherein a service chargeback transaction is a chargeback transaction initiated after a poor cardholder experience with the merchant.

The chargeback analytics computing device generates one or more metrics for the merchant using the service subset of the chargeback data. In the example embodiment, the chargeback analytics computing device calculates a merchant experience score based upon the service subset of the chargeback data. In some embodiments, the chargeback analytics computing device determines a ratio of a number of service chargeback transactions to a number of purchase transactions initiated at the merchant over a period of time, and calculates the merchant experience score using this ratio. In some embodiments, the chargeback analytics computing device determines a number of upheld service chargeback transactions, as some of the service chargeback transactions may be initiated but not upheld after the complete chargeback process (e.g., it was determined that the merchant did render goods and/or services as advertised). The merchant experience score is calculated using a ratio of the number of upheld service chargeback transactions to the number of purchase transactions.

In some embodiments, the chargeback analytics computing device also determines a relative ranking of the merchant (or merchants) compared to other merchants within a geographic area or a merchant industry. For example, the chargeback analytics computing device parses the transaction data to identify a merchant industry of the merchant. As another example, the chargeback analytics computing device parses the transaction data to identify a geographic area (e.g., ZIP code, city, county, state, etc.) where the merchant is located. The chargeback analytics computing device determines a baseline merchant experience score, the baseline merchant experience score representing a baseline (e.g., expected or average) score for a plurality of merchants, such as a plurality of merchants within the merchant industry or within the same geographic location, using at least some of the steps described above for calculating an individual merchant experience score for one merchant (e.g., a ratio of an aggregated or average number of service chargeback transactions to an aggregated or average number of purchase transactions). A comparison between the calculated merchant experience score for the merchant and the baseline merchant experience score is made, and the chargeback analytics computing device ranks the merchant based upon the comparison.

The chargeback analytics computing device then transmits the generated metrics to a receiving party. In some cases, the receiving party includes a requesting party that generated and transmitted a request for the metrics to the chargeback analytics computing device. In other cases, the receiving party includes an entity other than a requesting party, such as a merchant, acquirer, issuer, cardholders, and/or third party (e.g., a ranking or reviewing party).

In some embodiments, the chargeback analytics computing device is configured to transmit the generated metrics within an alert message. For instance, if a merchant is associated with a particularly poor score or poor ranking, that merchant or an acquirer associated therewith may wish to know. Accordingly, in some embodiments, when a merchant experience score meets a predefined alert criteria (e.g., exceeding a threshold or falling below a threshold, depending on the scale of the merchant experience score), the chargeback analytics computing device generates an alert message including the merchant experience score. The chargeback analytics computing device transmits the alert message to a merchant, an acquirer, and/or an issuer (and/or any other party that may enroll in or subscribe to the merchant ranking service). The alert message may include instructions causing the receiving computing device (e.g., a computing device associated with a merchant) to activate and display the alert (or a notification thereof) to the receiving party.

The methods and systems described herein may be implemented using computer programming or engineering techniques including computer software, firmware, hardware, or any combination or subset therefor. At least one of the technical problems addressed by this system includes: (i) lack of insight for customers in determining which merchants are unreliable; (ii) increased network traffic over the payment/chargeback network related to messages for chargeback transactions at unreliable merchants; (iii) excess data processing of chargeback data unrelated to reliability of merchants or cardholder experience with the merchant; and/or (iv) an overall decreased efficiency of the payment network.

The technical effect of the systems and methods described herein is achieved by performing at least one of the following steps: (i) retrieving transaction data for a merchant, the transaction data associated with a plurality of transactions initiated at the merchant by a corresponding plurality of cardholders; (ii) extracting chargeback data from the transaction data, the chargeback data associated with a plurality of chargeback transactions; (iii) parsing the chargeback data to identify a chargeback reason code associated with each of the plurality of chargeback transactions; (iv) based upon the identified chargeback reason codes, isolating a fraud-related portion of the chargeback data and a non-fraud-related portion of the chargeback data; (v) based upon the identified chargeback reason codes, extracting a service subset of the non-fraud-related portion of the chargeback data associated with service chargeback transactions, wherein a service chargeback transaction is initiated by a cardholder having an unsatisfactory experience with the merchant; (vi) calculating a merchant experience score based upon the service subset of the chargeback data; and (vii) transmitting the calculated merchant experience score to a receiving party.

The resulting technical effect achieved by the systems and methods described herein is at least one of: (i) improved decision-making tools and perspective for cardholders, acquirers, and/or issuers in choosing which merchants to do business with; (ii) reduced network processing, bandwidth, and storage requirements for chargeback dispute related messages; (iii) improved granularity of the analysis of chargeback data to more precisely characterize the cardholder experience at or satisfaction with a merchant; and/or (iv) reduced network traffic over the payment processing network to improve overall efficiency of the network.

In one embodiment, a computer program is provided, and the program is embodied on a computer-readable medium. In an example embodiment, the CDS system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the CDS system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing transaction data in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party transaction processing network 20 for processing data associated with financial transactions, including processing payment or purchase transactions (solid arrows), processing chargeback transactions (also referred to as "chargebacks," dashed arrows), and/or handling dispute arbitration (dot-dashed arrows). The present disclosure relates to transaction processing network 20, such as the Mastercard® payment card system payment network (also referred to as an "interchange" or "interchange network"). Mastercard® payment card system payment network 20 is a proprietary communications standard promulgated by Mastercard International Incorporated® for the exchange of financial transaction data between financial institutions that are members of Mastercard International Incorporated®. (Mastercard is a registered trademark of Mastercard International Incorporated located in Purchase, N.Y.).

In transaction processing network 20, a financial institution such as an issuer 30 issues a payment card for an account, such as a credit card account or a debit card account, to a cardholder 22, who uses the payment card to tender payment for a purchase from a merchant 24. To accept payment with the payment card, merchant 24 must normally establish an account with a financial institution that is part of the financial payment system. This financial institution is usually called the "merchant bank" or the "acquiring bank" or "acquirer bank" or simply "acquirer". When a cardholder 22 tenders payment 102 for a purchase with a payment card (also known as a financial transaction card), merchant 24 requests authorization 104 from acquirer 26 for the amount of the purchase. Such a request is referred to herein as an authorization request message. The request is usually performed through the use of a point-of-interaction terminal, also referred to herein as a point-of-sale device, which reads the cardholder's account information from the payment card (e.g., via a magnetic stripe, chip, etc.) and communicates electronically with the transaction processing computers of acquirer 26. For card-not-present (CNP) transactions, cardholder 22 provides payment information or billing data associated with the payment card electronically to merchant 24. The payment information received by merchant 24 is stored and transmitted to acquirer 26 and/or a payment processor 28 as part of an authorization request message 106. In some embodiments, merchant 24 transmits a plurality of authorization request messages together as a "batch" file to acquirer 26 and/or payment processor 28.

Using transaction processing network 20, specifically using payment processor 28, the computers of acquirer 26 or the merchant processor will communicate 108 with the computers of issuer 30, to determine 110 whether the cardholder's account 32 is in good standing and whether the purchase is covered by the cardholder's available credit line or account balance. Based on these determinations, the request for authorization will be declined or accepted. If the request is accepted, an authorization code is issued 112 to merchant 24.

When a request for authorization is accepted, the available credit line or available balance of cardholder's account 32 is decreased 114. Normally, a charge is not posted immediately to a cardholder's account because bankcard associations, such as MasterCard International Incorporated®, have promulgated rules that do not allow a merchant to charge, or "capture," a transaction until goods are shipped or services are rendered. When a merchant ships or delivers the goods or services, merchant 24 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, cardholder's account 32 is decreased 114. Normally, a charge is posted immediately to cardholder's account 32. The bankcard association then transmits the approval to the acquiring processor for distribution of goods/services, information, or cash in the case of an ATM.

After a transaction is captured, the transaction is settled 116 between merchant 24, acquirer 26, and issuer 30. Settlement refers to the transfer of financial data or funds between the merchant's account, acquirer 26, and issuer 30 related to the transaction. Usually, transactions are captured and accumulated into a "batch," which is settled as a group.

Also in network 20, cardholder 22 may initiate 120 a chargeback transaction to merchant 24 for one or more reasons. For example, cardholder 22 did not receive the purchased product or service from merchant 24, or believes the received product or service is defective or damaged; cardholder 22 does not recognize, or did not make, a payment transaction with merchant 24 processed to his/her payment account, or was a victim of fraud; the goods or services were either not as described or defective, including shipped merchandise was received damaged or not suitable for its intended purpose, or merchant 24 did not honor the terms and conditions of a contract; counterfeit goods alleged to be authentic were purchased; etc. In so doing, for example, cardholder 22 initially interacts 120 with issuer 30 to initiate a request (or claim) for the chargeback transaction (e.g., provides payment account details to issuer 30, details of the reason for making the chargeback transaction request, etc.). When issuer 30 determines that the chargeback transaction is appropriate (e.g., proper, valid, warranted, etc.), issuer 30 interacts 122/124 with acquirer 26, via payment processor 28, to obtain credit for the amount in dispute (and provides a temporary credit for the appropriate amount to the cardholder's account 32). Acquirer 26 may interact 126 with merchant 24 to perform its own determination of whether the chargeback transaction is appropriate. Then, if acquirer 26 determines that the chargeback transaction is appropriate, acquirer 26 removes the disputed amount from the merchant's account (such that merchant 24 suffers the loss), and reconciles as needed with issuer 30. If acquirer 26 does not determine that the chargeback transaction is appropriate, acquirer 26 may initiate arbitration proceedings 130 via payment processor 28 for dispute resolution over transaction processing network 20.

Figure 2:
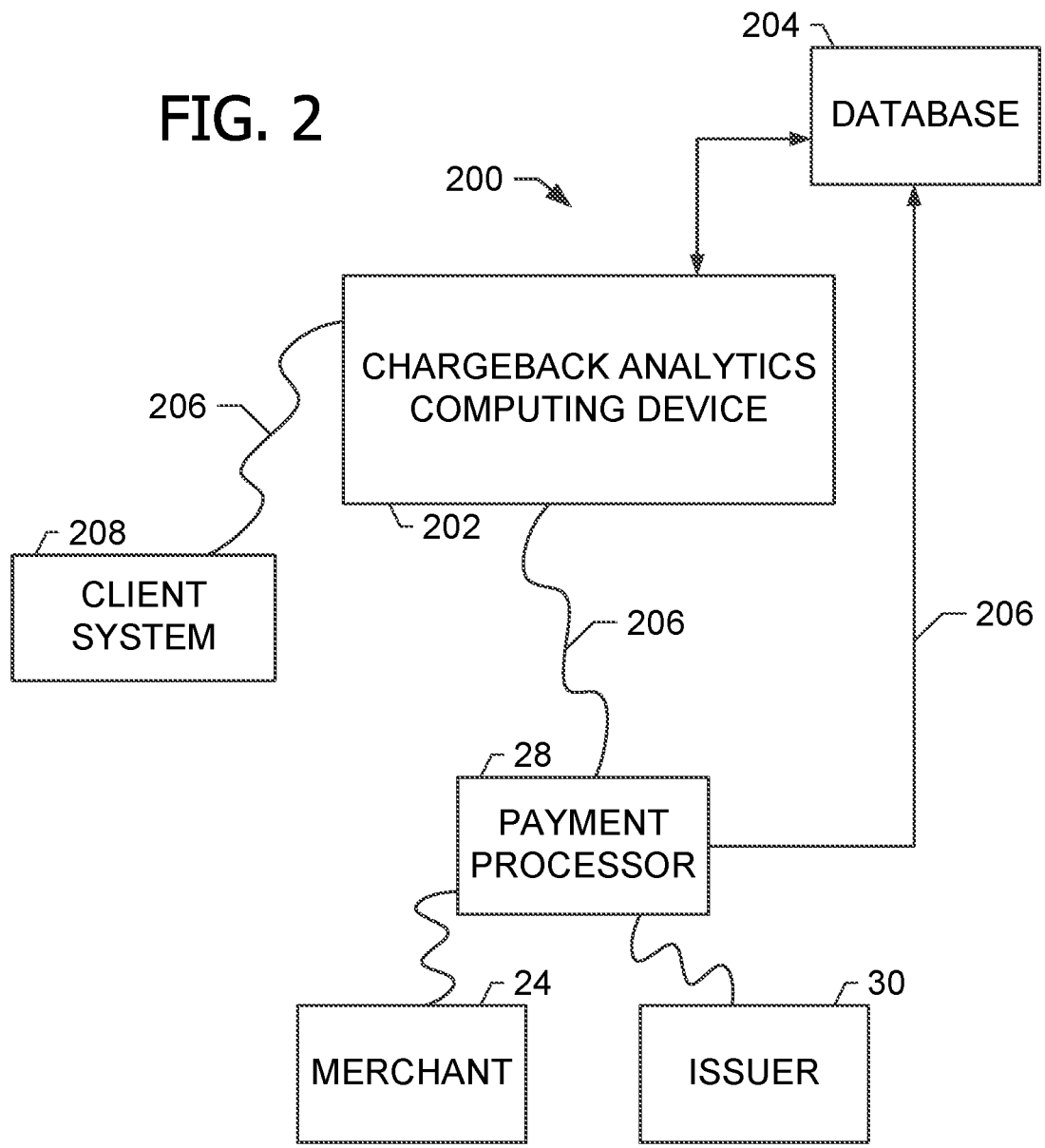

FIG. 2 is a block diagram of an example system 200 in which one or more aspects of the present disclosure may be implemented, including a chargeback analytics computing device 202. System 200 may include and/or may be associated with transaction processing network 20 (shown in FIG. 1). In the illustrated embodiment, system 200 includes chargeback analytics computing device 202, payment processor 28 in communication with at least one merchant 24 and issuer 30 (all shown in FIG. 1), a database 204, and at least one client system 208, each coupled to a network 206. Network 206 may include, without limitation, a wired and/or wireless network, a local area network (LAN), a wide area network (WAN) (e.g., the Internet, etc.), a mobile network, a virtual network, and/or another suitable public and/or private network capable of supporting communication among two or more of the illustrated components of system 200, or any combination thereof. In one example, network 206 includes multiple networks, where different ones of the multiple networks are accessible to different ones of the illustrated components of system 200.

In the illustrated embodiment, chargeback analytics computing device 202 is communicatively coupled to payment processor 28, client system(s) 208, and database 204. In some embodiments, database 204 is stored on chargeback analytics computing device 202. In alternative embodiments, database 204 is stored remotely from chargeback analytics computing device 202 and may be non-centralized. Database 204 contains (i.e., stores) information on a variety of matters, include transaction data (including purchase transaction data as well as chargeback transaction data), merchant profiles, merchant experience score(s), merchant rankings, scoring rules, and/or any other information. In the example embodiment, for both the payment transaction and the chargeback transaction described above, transaction data is generated as part of the interactions among merchant 24, acquirer 26, payment processor 28, issuer 30, and cardholder 22. The transaction may be stored at database 204 by payment processor 28 (and/or by any other party). The transaction data may include, without limitation, a PAN for the cardholder's payment account involved in the transaction, a payment amount for the product(s) and/or service(s) involved in the transaction, identifier(s) for the product(s) and/or service(s) involved in the transaction, description(s) of the product(s) and/or service(s) involved in the transaction, a listing of product(s) and/or service(s) involved in the transaction, a merchant name for merchant 24 involved in the transaction, a merchant identifier for merchant 24, a merchant category code assigned to merchant 24 (e.g., by transaction processing network 20 or by another payment network, based on a type of products and/or services provided by merchant 24, etc.), a date and/or time of the transaction, a location of the transaction, etc. In addition, the transaction data may include an indication of whether the transaction is a purchase or payment transaction or a chargeback transaction, such that purchase transaction data is distinguishable from chargeback transaction data. The chargeback transaction data, in particular, include a specific data element referred to as a "reason code."

A reason code is a string (or other data format) generated by issuer 30 when issuer 30 initiates the chargeback transaction with acquirer 26. Specifically, the reason code is one of a plurality of predetermined reason codes that identifies the nature or reason of the chargeback transaction. Certain reason codes identify fraud-related chargeback disputes (e.g., a cardholder disputes a transaction that the cardholder alleges was not made by them) and other reason codes identify non-fraud-related chargebacks. Of particular distinction with respect to the present disclosure are non-fraud-related chargebacks and the reason codes that specifically identify "service chargebacks," or chargebacks initiated by a cardholder based on a poor experience with a merchant. For example, service chargebacks may include (i) a cardholder did not receive the goods or services paid for, either partially or fully; (ii) a cardholder has received a counterfeit good alleged to be authentic; and/or (iii) goods or services were either not as described or defective. This specific subset of chargebacks, service chargebacks, may be offer a unique perspective into the level of service provided by the merchant. In other words, if a merchant has a high number of service chargebacks, it may indicate that cardholders are frequently dissatisfied with their experience with the merchant.

In the example embodiment, chargeback analytics computing device 202 is configured to access transaction data in database 204 (which may been stored there by payment processor 28, in some embodiments). Chargeback analytics computing device 202 is further configured to process and parse the transaction data to identify service chargebacks initiated with respect to a particular merchant (e.g., using reason codes specifically associated with service chargeback transactions). Based specifically on the service chargebacks, chargeback analytics computing device 202 scores the merchant with a "merchant experience score" that represents a quantitative rating of the cardholder experience with the merchant. Chargeback analytics computing device 202 may transmit the score to a client system 208.

In the example embodiment, client systems 208 (which may include "requesting parties" and/or "receiving parties") may include any entity that may request and/or receive merchant experience scores and/or other metrics (e.g., rankings) generated by chargeback analytics computing device 202. For example, client systems 208 may include individual cardholder computing devices, a merchant computing device associated with merchant 24, an acquirer computing device associated with acquirer 26, a rating or merchant review provider (e.g., a rating website such as Yelp™ TripAdvisor™, Google™, etc.), and/or any other entity. In the example embodiment, client systems 208 are computers including a web browser, such that chargeback analytics computing device 202 is accessible to client systems 208 using the Internet. Client system 208 may be any device capable of interconnecting to the Internet including a mobile computing device, such as a laptop or desktop computer, a web-based phone (e.g., a "smartphone"), a personal digital assistant (PDA), a tablet or phablet, a fitness wearable device, a smart refrigerator or other web-connectable appliance, a "smart watch" or other wearable device, or other web-connectable equipment. Although one client system 208 is shown in FIG. 2, it should be understood that system 200 may include any number of client systems 208.

In some embodiments, chargeback analytics computing device 202 interacts with payment processor 28 to access transaction data for processing. In other embodiments, payment processor 28 stores the transaction data at database 204, and chargeback analytics computing device 202 accesses the transaction data therefrom. In some embodiments, chargeback analytics computing device 202 receives alerts and/or other messages from payment processor 28, such as alerts that a threshold number of service chargebacks have been initiated with one merchant 24. Such alerts may automatically activate chargeback analytics computing device 202 to access transaction data associated with that merchant 24. In certain embodiments, chargeback analytics computing device 202 may be integral to payment processor 28. In such embodiments, instead of generating an alert or a message, payment processor 28 may activate the functionality (e.g., via a processor) described herein as implemented by chargeback analytics computing device 202.

In one embodiment, chargeback analytics computing device 202 is configured to communicate with a merchant 24 and/or an acquirer 26 associated with a merchant, or an issuer 30. For example, merchants 24 and/or acquirers 26, or issuers 30, may access enroll in a merchant rating service. Once enrolled, these entities may access chargeback analytics computing device 202 to request and/or receive merchant experience score(s) and/or other metrics associated with merchants 24. Accordingly, in some embodiments, chargeback analytics computing device 202 is configured to perform the scoring processes described herein "on demand," or in response to a request from a merchant 24, acquirer 26, and/or issuer 30.

Figure 3:
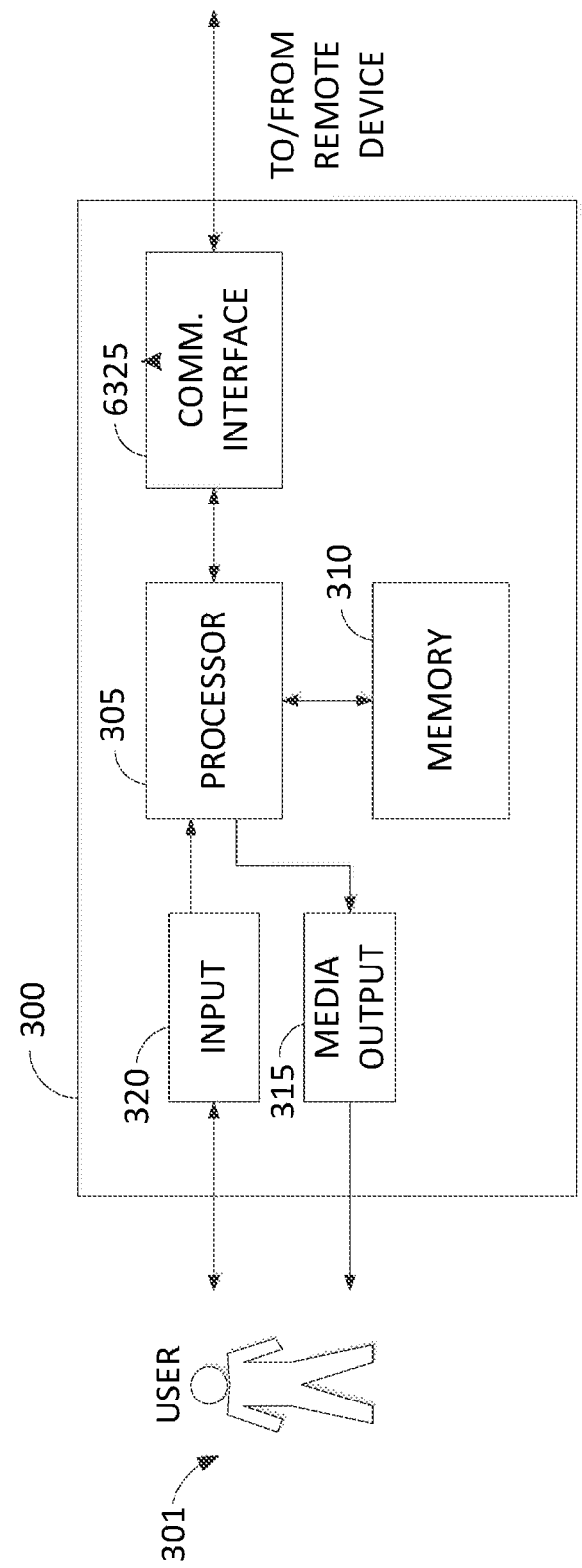

FIG. 3 illustrates an example configuration of a client computing device 300. Client computing device 300 may include, but is not limited to, client system 208, merchant 24, and/or issuer 30 shown in FIG. 2. Client computing device 300 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or other data to be stored and retrieved. Memory area 310 may include one or more computer-readable media.

Client computing device 300 also includes at least one media output component 315 for presenting information to a user 301. Media output component 315 is any component capable of conveying information to user 301. In some embodiments, media output component 315 includes an output adapter such as a video adapter and/or an audio adapter. An output adapter is operatively coupled to processor 305 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 300 includes an input device 320 for receiving input from user 301. Input device 320 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 315 and input device 320.

Client computing device 300 may also include a communication interface 325, which is communicatively coupleable to a remote device such as a chargeback analytics computing device 202. Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer-readable instructions for providing a user interface to user 301 via media output component 315 and, optionally, receiving and processing input from input device 320. A user interface may include, among other possibilities, a web browser and client application. Web browsers enable users 301 to display and interact with media and other information typically embedded on a web page or a website from a web server associated with a merchant or a merchant rating/ranking system. A client application allows users 301 to interact with a server application ("app") associated with, for example, an online merchant or a merchant rating/ranking system.

Figure 4:
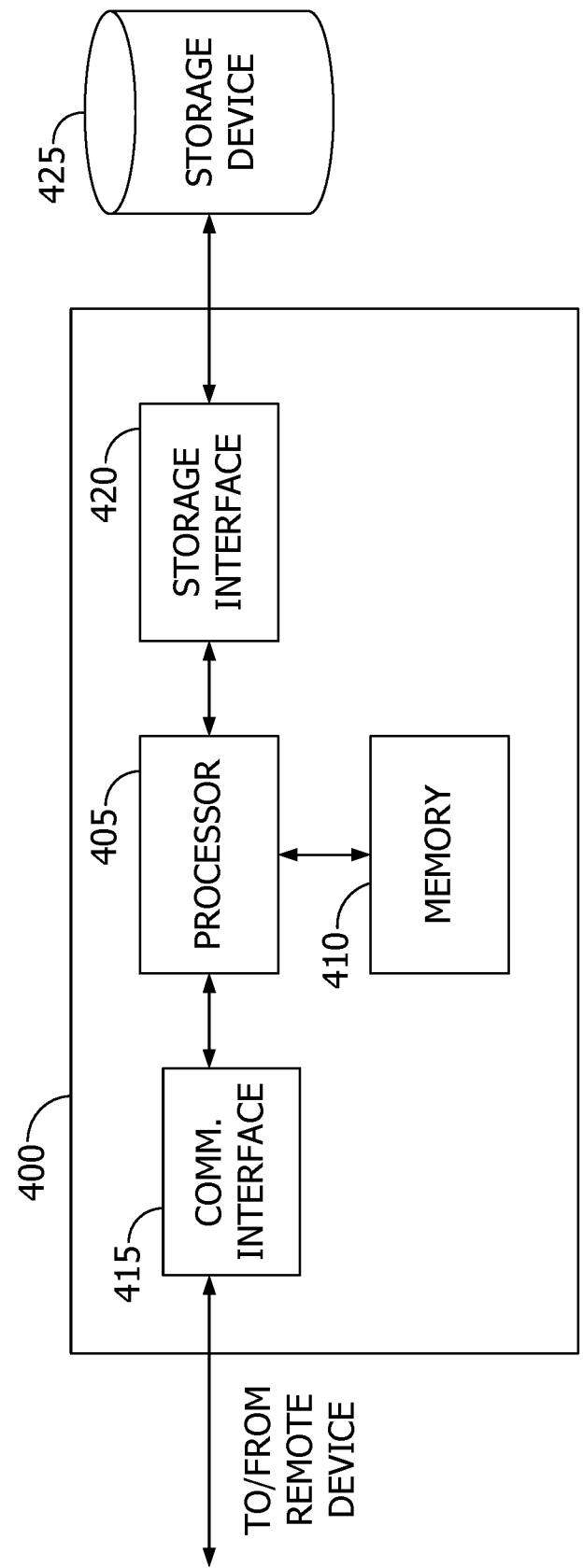

FIG. 4 illustrates an example configuration of a server computing device 400. Server computing device 400 may include, but is not limited to, chargeback analytics computing device 202 or payment processor 28 (both shown in FIG. 2). Server computing device 400 includes a processor 405 for executing instructions. Instructions may be stored in a memory area 410, for example. Processor 405 may include one or more processing units (e.g., in a multi-core configuration).

Processor 405 is operatively coupled to a communication interface 415 such that server computing device 400 is capable of communicating with a remote device such as client computing device 300 (shown in FIG. 3) or another server computing device 400. For example, communication interface 415 may receive requests for communication via the Internet, as illustrated in FIG. 2.

Processor 405 may also be operatively coupled to a storage device 425. Storage device 425 is any computer-operated hardware suitable for storing and/or retrieving data. In some embodiments, storage device 425 is integrated in server computing device 400. For example, server computing device 400 may include one or more hard disk drives as storage device 425. In other embodiments, storage device 425 is external to server computing device 400 and may be accessed by a plurality of server computing devices 400. For example, storage device 425 may include multiple storage units such as hard disks or solid state disks in a redundant array of inexpensive disks (RAID) configuration. Storage device 425 may include a storage area network (SAN) and/or a network attached storage (NAS) system.

In some embodiments, processor 405 is operatively coupled to storage device 425 via a storage interface 420. Storage interface 420 is any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Memory areas 410 and 310 (shown in FIG. 3) may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 5:
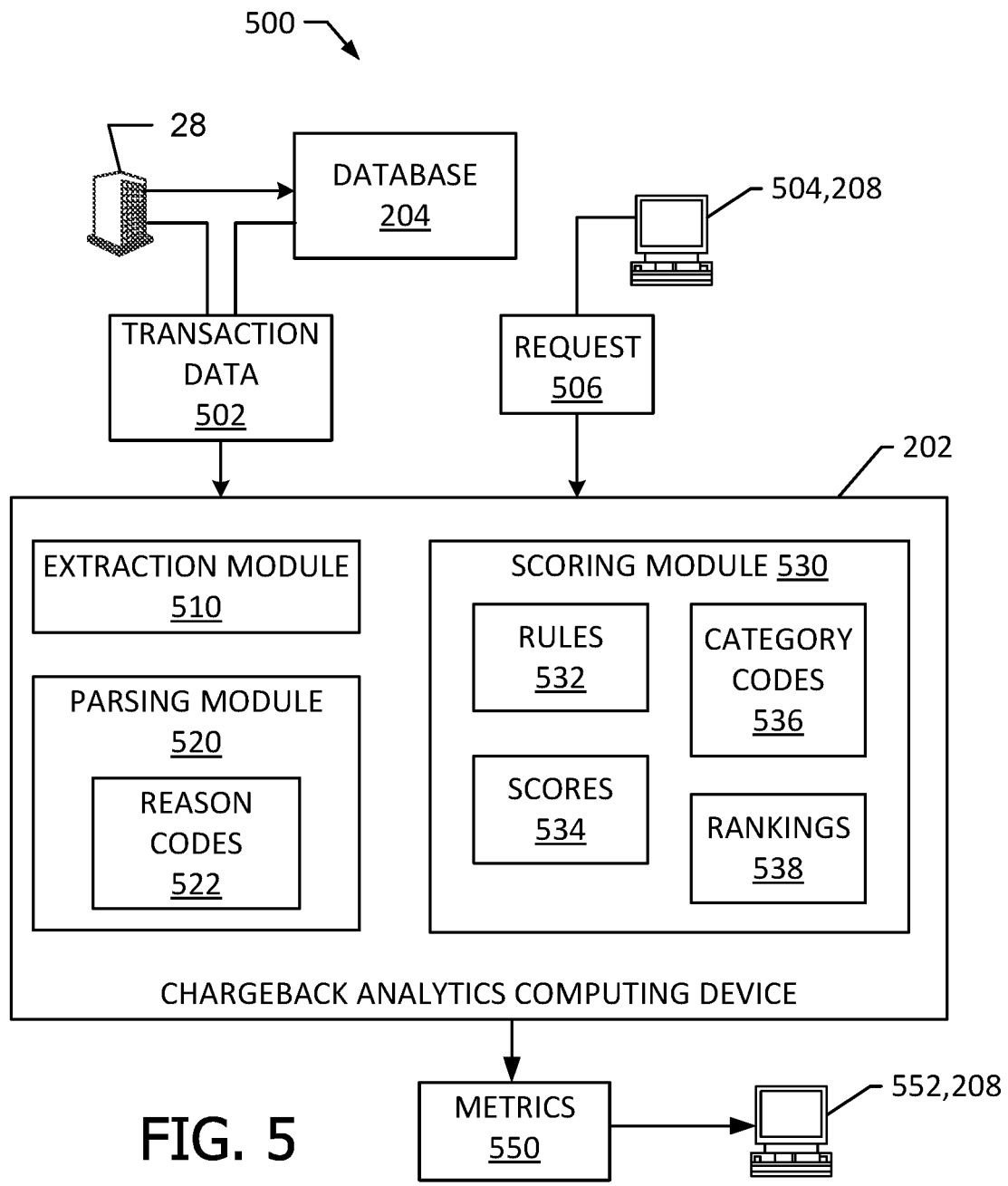

FIG. 5 is an example data flow diagram 500 illustrating the flow of data between components of system 200 (shown in FIG. 2). In particular, FIG. 5 depicts the flow of data between chargeback analytics computing device 202, payment processor 28 (also shown in FIG. 1), and one or more other parties 504, 552 (such as client systems 208, shown in FIG. 2). FIG. 5 further depicts the processing of data within chargeback analytics computing device 202 according to one or more embodiments of the present disclosure.

In the illustrated embodiment, chargeback analytics computing device 202 retrieves transaction data 502 for a merchant (e.g., a merchant 24, shown in FIG. 1). Transaction data 502 is associated with a plurality of transactions initiated at the merchant by a corresponding plurality of cardholders (e.g., cardholders 22, also shown in FIG. 1). In some embodiments, chargeback analytics computing device 202 is in communication with and/or integral to payment processor 28. Chargeback analytics computing device 202 may access (e.g., retrieve and/or receive) transaction data 502 from payment processor 28 and/or from database 204 (also shown in FIG. 2) at which payment processor 28 stores transaction data 502. Database 204 may be integral to chargeback analytics computing device 202, in some embodiments. Alternatively, database 204 is separate from and accessible to chargeback analytics computing device 202.

In some embodiments, chargeback analytics computing device 202 may receive one or more requests 506 (e.g., via a transaction processing network such as network 20, shown in FIG. 1, or otherwise, such as over the Internet using network 206, shown in FIG. 2) to generate metrics for a merchant (e.g., a merchant experience score). Request 506 may identify one or more merchants for which to generate the metrics. Request 506 originates from a requesting party 504, which may include a client system 208. Requesting party 504 may include, for example, the merchant(s) themselves, an acquirer, an issuer, a cardholder, and/or another entity. For instance, when requests 506 originate from the merchant(s), the merchant(s) may use the metrics in advertisements to consumers (e.g., cardholders, etc.) in order to solicit business. When requests 506 originate from other parties, those parties may then use the metrics in advertisements to the consumers on behalf of the merchant(s) (e.g., to highlight certain merchants with higher scores as trusted merchants, etc.), or they may use the metrics to help determine with which merchants to associate (e.g., as trusted merchants, etc.), to help inhibit dealings with potentially unreliable merchants, or to compare the merchants to each other or to other merchants in similar industries, etc. These requesting parties (also referred to as "receiving parties" 552 when described as receiving metrics) may further include, without limitation, online shopping providers of aggregated merchant sales listings (e.g., Amazon™, Google™, Etsy™, eBay™ Yelp™ TripAdvisor™, etc.), manufacturers, shipping entities, rating entities, ranking entities, review entities, etc. Receiving a request 506 may cause chargeback analytics computing device 202 to initiate the retrieval of transaction data 502.

Additionally or alternatively, chargeback analytics computing device 202 may detect that a threshold number of service chargeback transactions (e.g., more than X number of service chargebacks) associated with the merchant have been initiated, and subsequently initiate the retrieval of transaction data 502. In some cases, payment processor 28 (or another entity) may detect that the threshold number of service chargeback transactions have been initiated and may send an alert or instruction message (not shown) to chargeback analytics computing device 202. The alert/instruction message may activate chargeback analytics computing device 202 to initiate the retrieval of transaction data 502.

Chargeback analytics computing device 202 includes several modules configured to perform at least some steps as described herein. Modules may include sets of computer-executable instructions that are executed using a processor of chargeback analytics computing device 202 (e.g., processor 405, shown in FIG. 4) and cause the processor to perform the steps described herein. Alternatively, one or more of the modules may include separate processing devices specifically programmed to perform the steps described herein. In the illustrated embodiment, chargeback analytics computing device 202 includes an extraction module 510, a parsing module 520, and a scoring module 530. In some embodiments, one or more of these modules may be combined with and/or integral one or more others of these modules, and/or chargeback analytics computing device 202 may include additional/alternative modules.

Extraction module 510 is configured to extract chargeback data from transaction data 502, the chargeback data associated with a plurality of chargeback transactions. In other words, extraction module 510 separates transaction data associated with chargeback transactions from transaction data associated with purchase or payment transactions. In some embodiments, extraction module 510 may extract the chargeback data by identifying the presence of a reason code data element that is only used/present for chargeback transaction processing (e.g., this data element is blank or absent for transaction records associated with payment/purchase transactions). In other embodiments, extraction module 510 may extract the chargeback data using one or more other processing methods.

Parsing module 520 is configured to parse the chargeback data to identify a chargeback reason code 522 associated with each of the plurality of chargeback transactions. In some embodiments, parsing module 520 accesses a table or list of chargeback reason codes 522 and their respective "reasons" or meanings. For example, a reason code 522 of the string "1234" may be associated with a "goods or services not received" reason for initiating the chargeback.

Based upon chargeback reason codes 522, parsing module 520 isolates a fraud-related portion of the chargeback data and a non-fraud-related portion of the chargeback data. In other words, parsing module 520 reduces the amount of data for further processing by disregarding or discarding the chargeback data not relevant to the generation of the merchant experience score (and/or any other metrics described herein), such as the fraud-related portion of the chargeback data. In addition, based upon chargeback reason codes 522, parsing module 520 extracts a "service subset" of the non-fraud-related portion of the chargeback data. The service subset of the chargeback data includes the data associated with service chargeback transactions, wherein a service chargeback transaction is a chargeback transaction initiated after a poor cardholder experience with the merchant.

Scoring module 530 is configured to generate one or more metrics for the merchant using the service subset of the chargeback data. In the illustrated embodiment, scoring module 530 accesses one or more rules 532 that instruct scoring module 530 to generate the one or more metrics. Rules 532 may include instructions causing scoring module 530 to follow a plurality of ordered steps in calculating scores 534 and/or rankings 538, as described further herein. Rules 532 may additionally or alternatively include predefined criteria instructing scoring module 530 under certain circumstances to generate or not generate metrics. For instance, certain rules 532 may cause scoring module 530 to generate a merchant experience score 534 for a merchant after a threshold number of service chargebacks associated with that merchant are initiated. In the example embodiment, scoring module 530 calculates a merchant experience score 534 based upon the service subset of the chargeback data. In some embodiments, scoring module 530 determines a ratio of a number of service chargeback transactions to a number of purchase transactions initiated at the merchant over a period of time, and calculates the merchant experience score 534 using this ratio. In some embodiments, scoring module 530 determines a number of upheld service chargeback transactions, as some of the service chargeback transactions may be initiated but not upheld after the complete chargeback process (e.g., it was determined that the merchant did render goods and/or services as advertised). The merchant experience score 534 is calculated using a ratio of the number of upheld service chargeback transactions to the number of purchase transactions.

In some embodiments, scoring module 530 also determines a relative ranking 538 of the merchant (or merchants) compared to other merchants within a geographic area or a merchant industry. For example scoring module 530 parses transaction data 502 to identify a merchant industry of the merchant, based upon a merchant category code 536 included in transaction data 502 associated with the merchant. As another example, scoring module 530 parses transaction data 502 to identify a geographic area (e.g., ZIP code, city, county, state, etc.) where the merchant is located. Scoring module 530 determines a baseline merchant experience score, the baseline merchant experience score representing a baseline (e.g., expected or average) score for a plurality of merchants, such as a plurality of merchants within the merchant industry or within the same geographic location, using at least some of the steps described above for calculating an individual merchant experience score 534 for one merchant (e.g., a ratio of an aggregated or average number of service chargeback transactions to an aggregated or average number of purchase transactions). A comparison between the calculated merchant experience score 534 for the merchant and the baseline merchant experience score is made, and scoring module 530 ranks the merchant based upon the comparison.

Chargeback analytics computing device 202 then transmits the generated metrics 550 (e.g., scores 534 and/or rankings 538) to receiving party 552. In some cases, receiving party 552 includes requesting party 504 that generated and transmitted request 506 for metrics 550. In other cases, receiving party 552 includes an entity other than requesting party 504, such as a merchant, acquirer, issuer, cardholders, and/or third party (e.g., a ranking or reviewing party).

In some embodiments, chargeback analytics computing device 202 is configured to transmit the generated metrics 550 within an alert message (not specifically shown). For instance, if a merchant is associated with a particularly poor score 534 or poor ranking 538, that merchant or an acquirer associated therewith may wish to know. Accordingly, in some embodiments, when a merchant experience score meets a predefined alert criteria, which may be stored as a rule 532 (e.g., exceeding a threshold or falling below a threshold, depending on the scale of the merchant experience score), chargeback analytics computing device 202 generates an alert message including the merchant experience score 534. Chargeback analytics computing device 202 transmits the alert message to a merchant, an acquirer, and/or an issuer (and/or any other party that may enroll in or subscribe to the merchant ranking service). The alert message may include instructions causing the receiving computing device (e.g., a computing device associated with a merchant) to activate and display the alert (or a notification thereof) to the receiving party.

FIG. 6 is a flowchart of a method 600 for generating chargeback analytics using system 200 (shown in FIG. 2), more specifically, using chargeback analytics computing device 202. In certain embodiments, method 600 may be at least partially performed by a different computing device. In other embodiments, method 600 may include additional, fewer, or alternative actions, including those described elsewhere herein.

Method 600 includes retrieving 602 (which may additionally or alternatively be referring as accessing or receiving) transaction data for a merchant, the transaction data associated with a plurality of transactions initiated at the merchant by a corresponding plurality of cardholders. Method 600 also includes extracting 604 chargeback data from the transaction data, the chargeback data associated with a plurality of chargeback transactions, and parsing 606 the chargeback data to identify a chargeback reason code associated with each of the plurality of chargeback transactions. Method 600 includes isolating 608, based upon the identified chargeback reason codes, a fraud-related portion of the chargeback data and a non-fraud-related portion of the chargeback data. Method 600 further includes extracting 610, based upon the identified chargeback reason codes, a service subset of the non-fraud-related portion of the chargeback data associated with service chargeback transactions, wherein a service chargeback transaction is initiated by a cardholder having an unsatisfactory experience with the merchant. In addition, method 600 includes calculating 612 a merchant experience score based upon the service subset of the chargeback data, and transmitting 614 the calculated merchant experience score to a receiving party.

Described herein are computer systems such as a payment processor (such as a payment network), a client computing device, and a chargeback analytics computing device. As described herein, all such computer systems include a processor and a memory. Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above examples are for example only, and are thus not intended to limit in any way the definition and/or meaning of the term "processor."

The term database, as used herein, refers to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, the terms "software" and "firmware" are interchangeable, and include any computer program stored in memory for execution by a processor (e.g., 304, 404), including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media,"

however, do not include transitory signals (i.e., they are "non-transitory"). The term "machine-readable signal" refers to any signal used to provide machine instructions and/or data to a programmable processor.

In addition, although various elements of the chargeback analytics computing device are described herein as including general processing and memory devices, it should be understood that the chargeback analytics computing device is a specialized computer configured to perform the steps described herein for generating chargeback analytics, such as merchant experience scores and merchant ranking, that identify a customer (e.g., cardholder) level of satisfaction or dissatisfaction with the goods and/or services provided by a merchant.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A chargeback analytics computing device including a processor in communication with a memory, said processor programmed to:
    receive, by said processor from a payment processor of a payment processing network over a first communication network, an alert indicating that a threshold number of chargebacks initiated with a first merchant have been processed over the payment processing network, wherein the chargeback analytics computing device is communicatively coupled to the payment processor over the first communication network, the payment processing network including a proprietary communications standard promulgated for the exchange of transaction data between parties to financial transactions;
    in response to receiving the alert, retrieve, by said processor from the payment processor via the first communication network, transaction data for the first merchant, the transaction data associated with a plurality of transactions initiated at the first merchant by a corresponding plurality of cardholders;
    extract, by said processor, chargeback data including a plurality of chargeback messages from the transaction data based upon the presence of a chargeback reason code in each of the plurality of chargeback messages, the chargeback data associated with a plurality of chargeback transactions;
    parse, by said processor, the chargeback data to identify the respective chargeback reason code associated with each of the plurality of chargeback transactions;
    based upon the identified chargeback reason codes, isolate, by said processor, a fraud-related portion of the chargeback data and a non-fraud-related portion of the chargeback data;
    discard, by said processor, the fraud-related portion of the chargeback data to reduce an amount of data remaining for further processing by said processor;
    based upon the identified chargeback reason codes, extract, by said processor, a service subset of the non-fraud-related portion of the chargeback data associated with service chargeback transactions, wherein a service chargeback transaction is initiated by a cardholder having an unsatisfactory experience with the first merchant;
    calculate, by said processor, a merchant experience score based upon the service subset of the chargeback data, wherein the merchant experience score represents a quantitative rating of cardholder experience with the first merchant;
    store, by said processor, the merchant experience score in a database, wherein the database is configured to store merchant experience scores for subsequent retrieval and monitoring, by said processor, of the merchant experience score; and
    transmit, by said processor over a second communication network, the calculated merchant experience score to a client device associated with a receiving party that embeds the merchant experience score in a web page or software application, wherein users access the merchant experience score within the web page via a web browser or via the software application.

2. The chargeback analytics computing device of claim 1, wherein said processor is further programmed to:
    electronically detect, by said processor, that the stored merchant experience score meets a predefined alert criteria defined by one of the first merchant or an acquirer thereof;
    generate an alert message including the merchant experience score; and
    transmit the alert message to at least one of the first merchant and the acquirer thereof, wherein the alert message further includes instructions causing a computing device associated with the at least one of the first merchant and the acquirer to activate and notify the at least one of the first merchant and the acquirer of the merchant experience score.

3. The chargeback analytics computing device of claim 1, wherein said processor is further programmed to:
    determine, from the retrieved transaction data, a number of purchase transactions conducted at the first merchant;
    calculate a ratio of a number of the service chargeback transactions to the number of purchase transactions for the first merchant; and
    further calculate the merchant experience score based upon the ratio.

4. The chargeback analytics computing device of claim 1, wherein said processor is further programmed to:
    determine, from the retrieved transaction data, a number of purchase transactions conducted at the first merchant;
    determine, from the service subset of the chargeback data, a number of upheld service chargeback transactions;
    calculate a ratio of the number of upheld service chargeback transactions to the number of purchase transactions for the first merchant; and
    further calculate the merchant experience score based upon the ratio.

5. The chargeback analytics computing device of claim 1, wherein said processor is further programmed to:
    electronically parse the transaction data to identify a merchant industry of the first merchant;
    determine a baseline merchant experience score for a plurality of merchants within the merchant industry;
    compare the calculated merchant experience score for the first merchant to the baseline merchant experience score;
    rank the first merchant based upon the comparison; and transmit the rank to the client device associated with the receiving party.

6. The chargeback analytics computing device of claim 1, wherein said processor is further programmed to:
electronically parse the transaction data to identify a geographic area within which the first merchant is located;
determine a baseline merchant experience score for a plurality of merchants within the geographic area;
compare the calculated merchant experience score for the first merchant to the baseline merchant experience score;
rank the first merchant based upon the comparison; and
transmit the rank to the client device associated with the receiving party.

7. A computer-implemented method for generating chargeback analytics associated with service chargebacks, the method implemented using a chargeback analytics computing device including a processor in communication with a memory, the method comprising:
receiving, by the processor from a payment processor of a payment processing network over a first communication network, an alert indicating that a threshold number of chargebacks initiated between respective cardholders and respective merchants have been processed over the payment processing network, wherein the chargeback analytics computing device is communicatively coupled to the payment processor over the first communication network, the payment processing network including a proprietary communications standard promulgated for the exchange of transaction data between parties to financial transactions;
in response to receiving the alert, retrieving, by the processor from the payment processor via the first communication network, transaction data for the first merchant, the transaction data associated with a plurality of transactions initiated at the first merchant by a corresponding plurality of cardholders;
extracting, by the processor, chargeback data including a plurality of chargeback messages from the transaction data based upon the presence of a chargeback reason code in each of the plurality of chargeback messages, the chargeback data associated with a plurality of chargeback transactions;
parsing, by the processor, the chargeback data to identify the respective chargeback reason code associated with each of the plurality of chargeback transactions;
based upon the identified chargeback reason codes, isolating, by the processor, a fraud-related portion of the chargeback data and a non-fraud-related portion of the chargeback data;
discarding, by the processor, the fraud-related portion of the chargeback data to reduce an amount of data remaining for further processing by said processor;
based upon the identified chargeback reason codes, extracting, by the processor, a service subset of the non-fraud-related portion of the chargeback data associated with service chargeback transactions, wherein a service chargeback transaction is initiated by a cardholder having an unsatisfactory experience with the first merchant;
calculating, by the processor, a merchant experience score based upon the service subset of the chargeback data, wherein the merchant experience score represents a quantitative rating of cardholder experience with the first merchant;
storing, by the processor, the merchant experience score in a database, wherein the database is configured to store merchant experience scores for subsequent retrieval and monitoring, by said processor, of the merchant experience score; and
transmitting, by the processor over a second communication network, the calculated merchant experience score to a client device associated with a receiving party that embeds the merchant experience score in a web page or software application, wherein users access the merchant experience score within the web page via a web browser or via the software application.

8. The method of claim 7 further comprising:
electronically detecting, by the processor, that the stored merchant experience score meets a predefined alert criteria defined by one of the first merchant or an acquirer thereof;
generating an alert message including the merchant experience score; and
transmitting the alert message to at least one of the first merchant and the acquirer thereof, wherein the alert message further includes instructions causing a computing device associated with the at least one of the first merchant and the acquirer to activate and notify the at least one of the first merchant and the acquirer of the merchant experience score.

9. The method of claim 7, wherein calculating a merchant experience score comprises:
determining, from the retrieved transaction data, a number of purchase transactions conducted at the first merchant; and
calculating a ratio of a number of the service chargeback transactions to the number of purchase transactions for the first merchant.

10. The method of claim 7, wherein calculating a merchant experience score comprises:
determining, from the retrieved transaction data, a number of purchase transactions conducted at the first merchant;
determining, from the service subset of the chargeback data, a number of upheld service chargeback transactions; and
calculating a ratio of the number of upheld service chargeback transactions to the number of purchase transactions for the first merchant.

11. The method of claim 7 further comprising:
electronically parsing the transaction data to identify a merchant industry of the first merchant;
determining a baseline merchant experience score for a plurality of merchants within the merchant industry;
comparing the calculated merchant experience score for the first merchant to the baseline merchant experience score;
ranking the first merchant based upon the comparison; and
transmitting the rank to the client device associated with the receiving party.

12. The method of claim 7 further comprising:
electronically parsing the transaction data to identify a geographic area within which the first merchant is located;
determining a baseline merchant experience score for a plurality of merchants within the geographic area;
comparing the calculated merchant experience score for the first merchant to the baseline merchant experience score;

ranking the first merchant based upon the comparison; and transmitting the rank to the client device associated with the receiving party.

13. At least one non-transitory computer-readable storage medium having computer-executable instructions embodied thereon, wherein when executed by a chargeback analytics computing device including a processor in communication with a memory, the computer-executable instructions cause the chargeback analytics computing device to:

receive, by the chargeback analytics computing device from a payment processor of a payment processing network over a first communication network, an alert indicating that a threshold number of chargebacks initiated with the first merchant have been processed over the payment processing network, wherein the chargeback analytics computing device is communicatively coupled to the payment processor over the first communication network, the payment processing network including a proprietary communications standard promulgated for the exchange of transaction data between parties to financial transactions;

in response to receiving the alert, retrieve, by the chargeback analytics computing device from the payment processor via the first communication network, transaction data for the first merchant, the transaction data associated with a plurality of transactions initiated at the first merchant by a corresponding plurality of cardholders;

extract, by the chargeback analytics computing device, chargeback data including a plurality of chargeback messages from the transaction data based upon the presence of a chargeback reason code in each of the plurality of chargeback messages, the chargeback data associated with a plurality of chargeback transactions;

parse, by the chargeback analytics computing device, the chargeback data to identify the respective chargeback reason code associated with each of the plurality of chargeback transactions;

based upon the identified chargeback reason codes, isolate, by said processor, a fraud-related portion of the chargeback data and a non-fraud-related portion of the chargeback data;

discard, by the chargeback analytics computing device, the fraud-related portion of the chargeback data to reduce an amount of data remaining for further processing by the chargeback analytics computing device;

based upon the identified chargeback reason codes, extract, by the chargeback analytics computing device, a service subset of the non-fraud-related portion of the chargeback data associated with service chargeback transactions, wherein a service chargeback transaction is initiated by a cardholder having an unsatisfactory experience with the first merchant;

calculate, by the chargeback analytics computing device, a merchant experience score based upon the service subset of the chargeback data, wherein the merchant experience score represents a quantitative rating of cardholder experience with the first merchant;

store, by the chargeback analytics computing device, the merchant experience score in a database, wherein the database is configured to store merchant experience scores for subsequent retrieval and monitoring, by the chargeback analytics computing device, of the merchant experience score; and transmit, by the chargeback analytics computing device a second communication network, the calculated merchant experience score to a client device associated with a receiving party that embeds the merchant experience score in a web page or software application, wherein users access the merchant experience score within the web page via a web browser or via the software application.

14. The non-transitory computer-readable medium of claim 13, wherein the computer-executable instructions further cause the chargeback analytics computing device to:

electronically detect, by the chargeback analytics computing device, that the stored merchant experience score meets a predefined alert criteria defined by one of the first merchant or an acquirer thereof;

generate an alert message including the merchant experience score; and transmit the alert message to at least one of the first merchant and the acquirer thereof, wherein the alert message further includes instructions causing a computing device associated with the at least one of the first merchant and the acquirer to activate and notify the at least one of the first merchant and the acquirer of the merchant experience score.

15. The non-transitory computer-readable medium of claim 13, wherein the computer-executable instructions further cause the chargeback analytics computing device to:

determine, from the retrieved transaction data, a number of purchase transactions conducted at the first merchant;

calculate a ratio of a number of the service chargeback transactions to the number of purchase transactions for the first merchant; and further calculate the merchant experience score based upon the ratio.

16. The chargeback analytics computing device of claim 1, wherein the processor is further programmed to cause display of the merchant experience score at the client device of the receiving party to identify to a user of the client device a relative performance the first merchant.

17. The method of claim 7 further comprising causing display of the merchant experience score at the client device of the receiving party to identify to a user of the client device a relative performance the first merchant.

* * * * *